Dec. 4, 1973    TAKAO SAGAWA ET AL    3,777,023
MACROTETROLIDE MITICIDE AND INSECTICIDE
Filed Sept. 8, 1970    10 Sheets-Sheet 1
Fig. 1-a
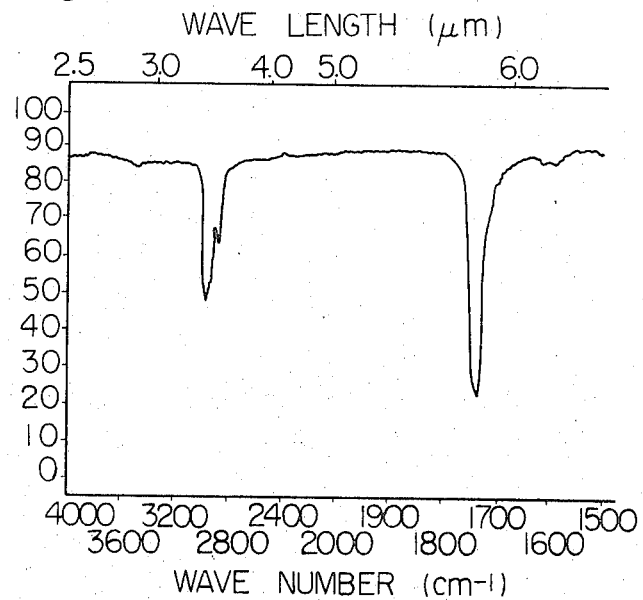
Fig. 1-b
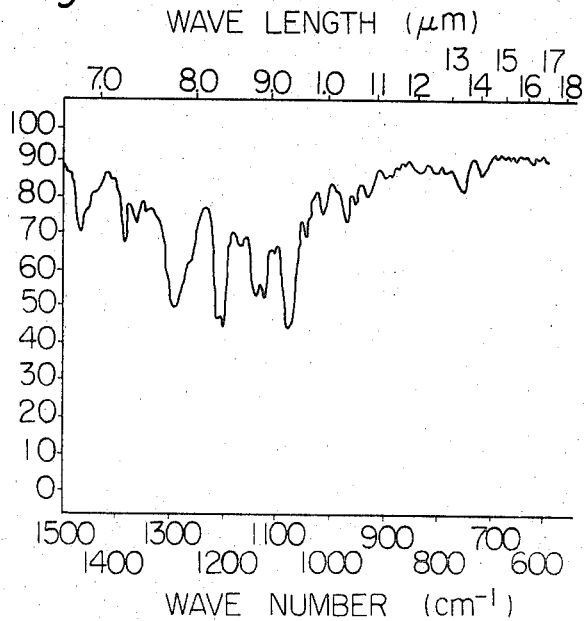

Fig. 2-a
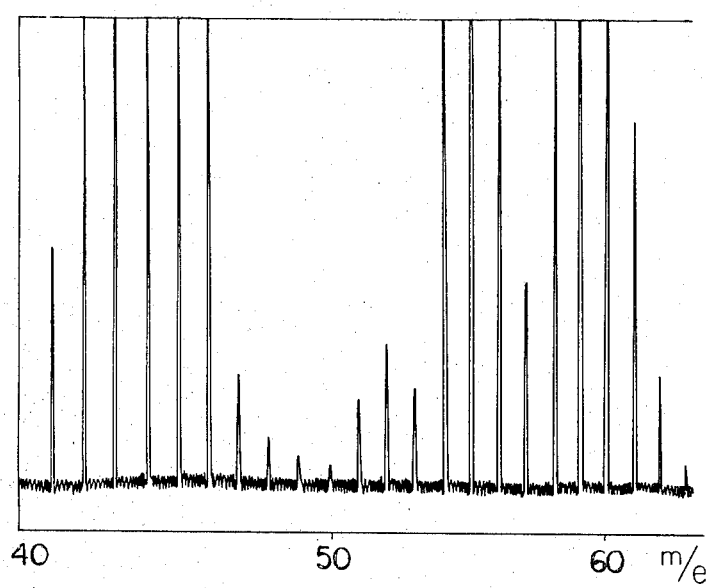
Fig. 2-b
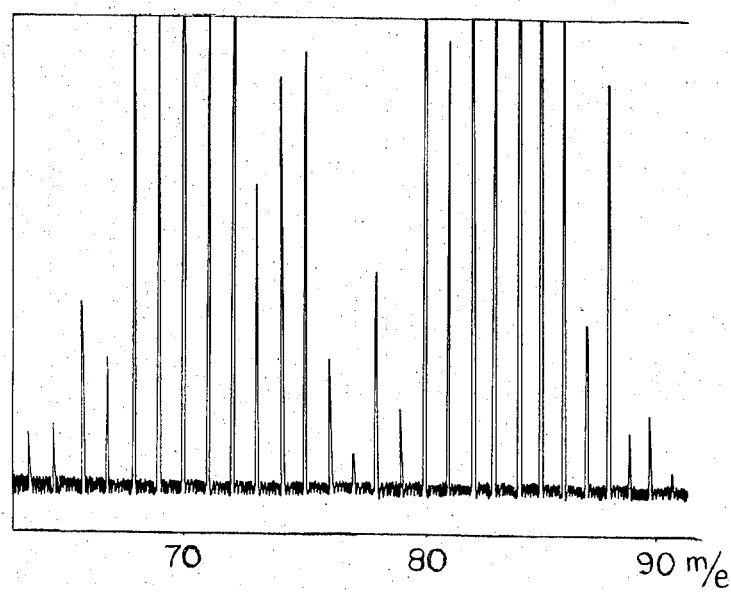

Fig. 2-c
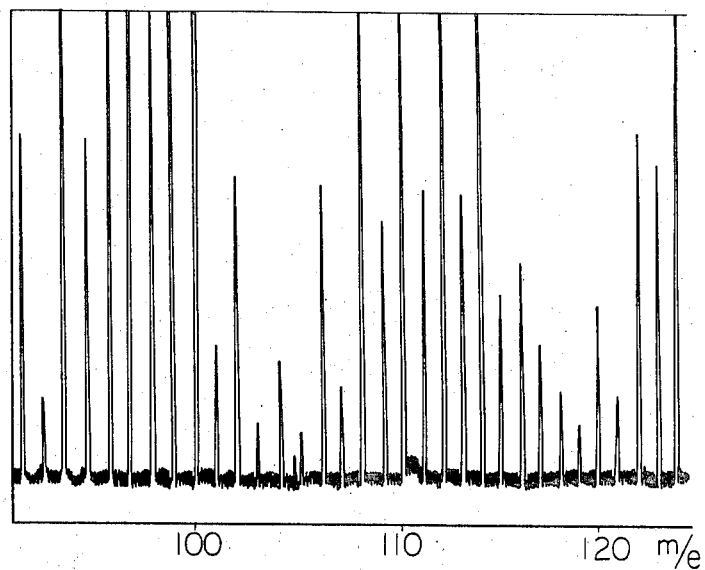
Fig. 2-d
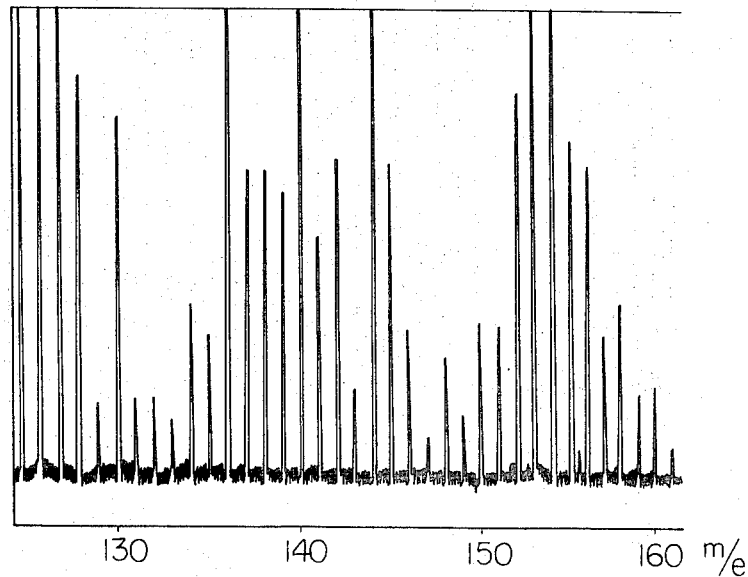

Fig. 2-e
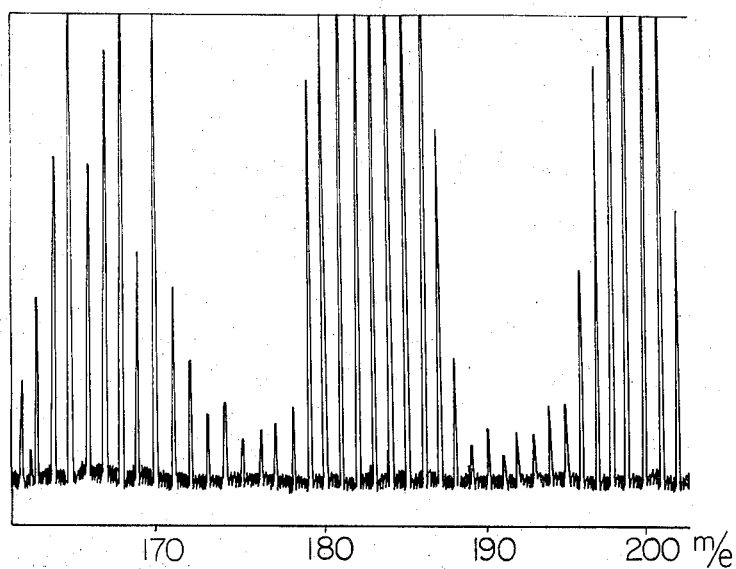
Fig. 2-f
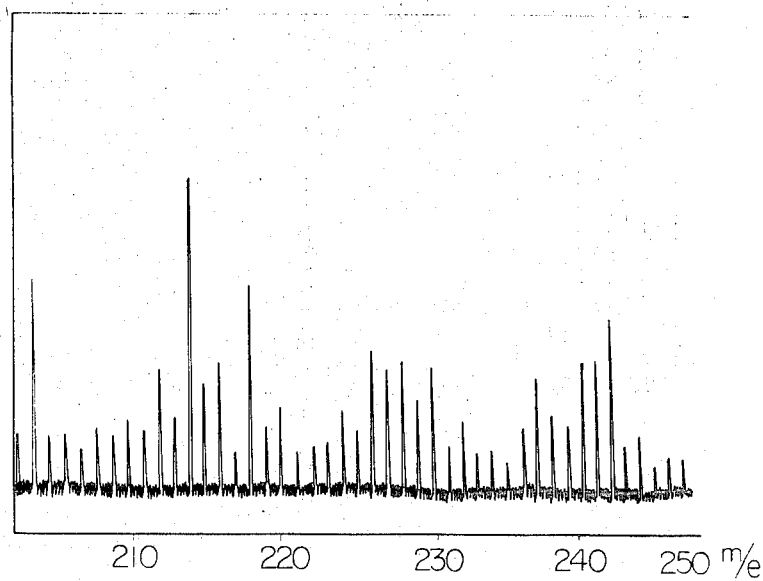

Fig. 2-g
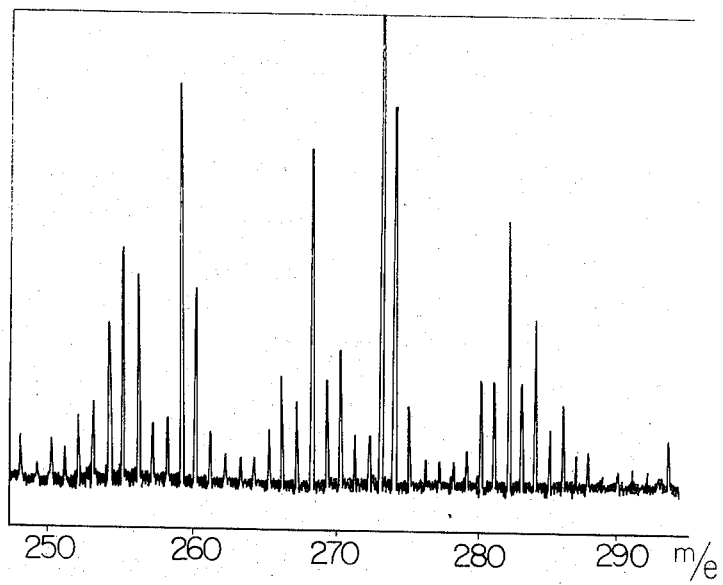
Fig. 2-h
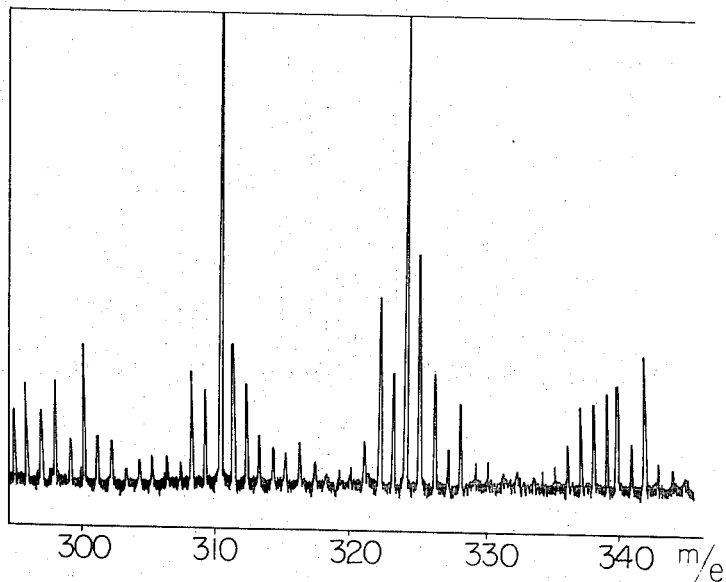

Fig. 2-i
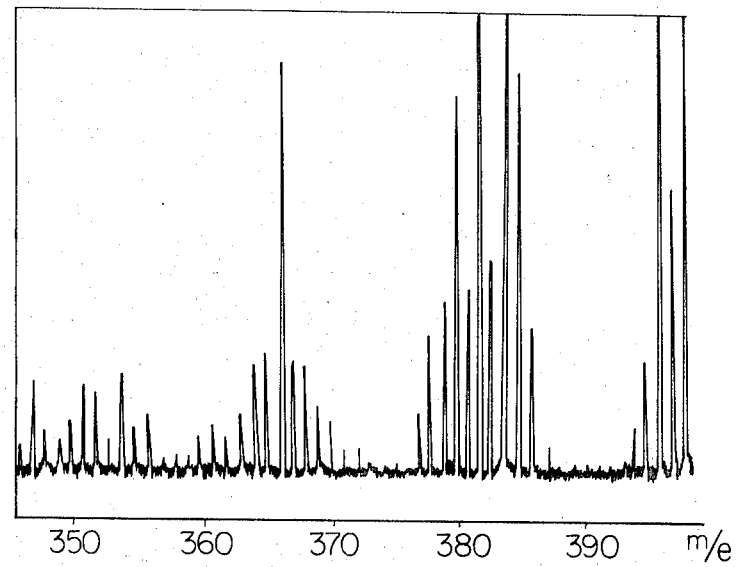
Fig. 2-j
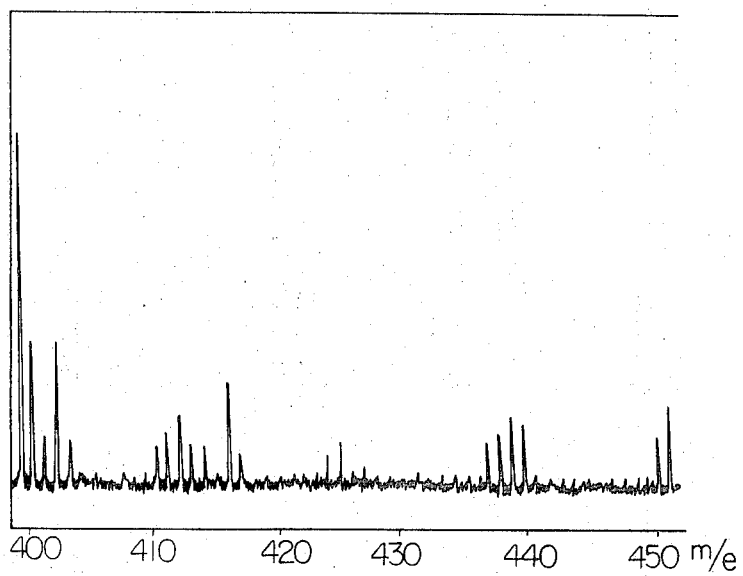

Fig. 2-k
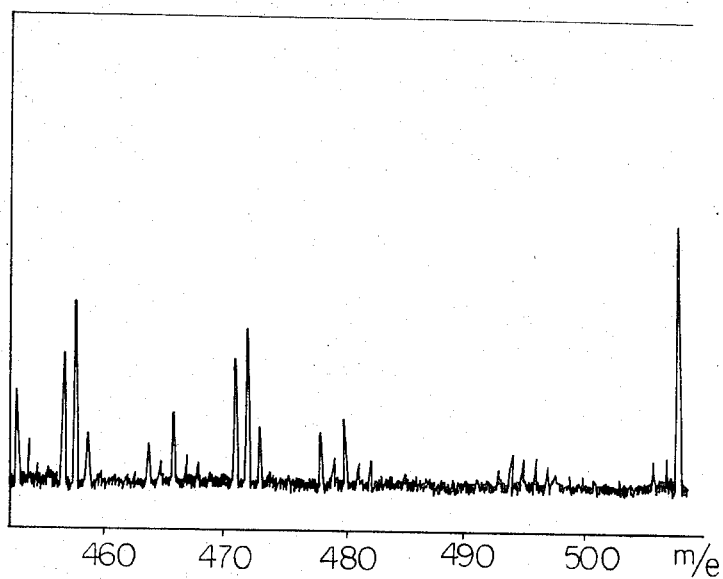
Fig. 2-l
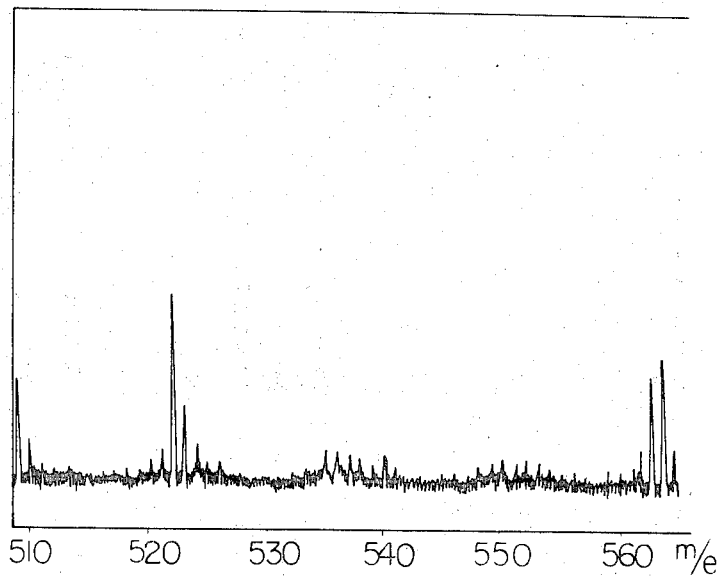

Fig. 2-m
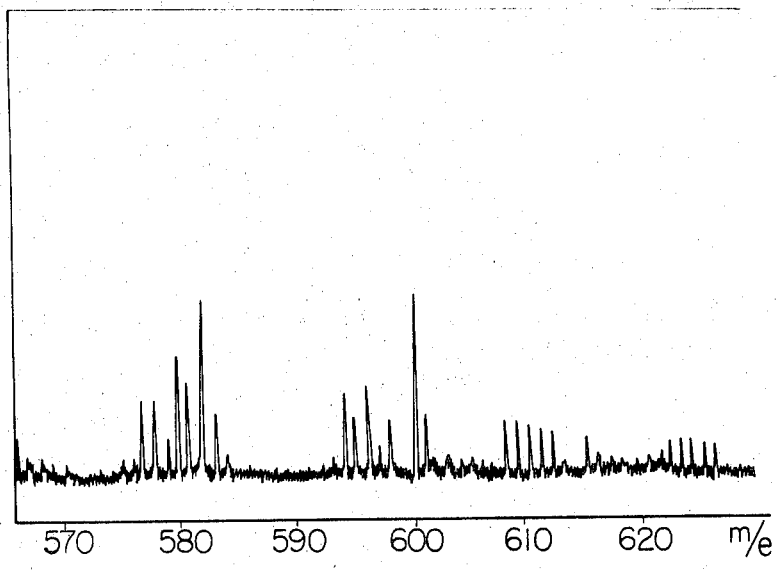
Fig. 2-n
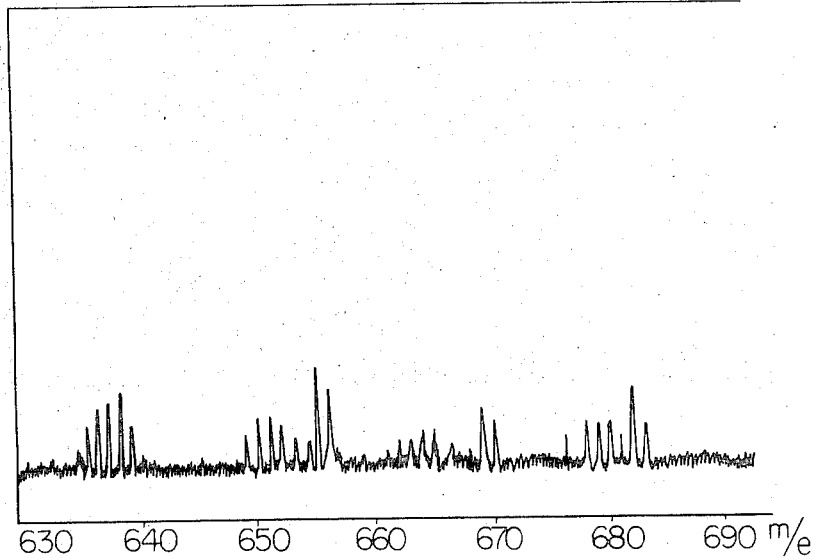

Fig. 2-o
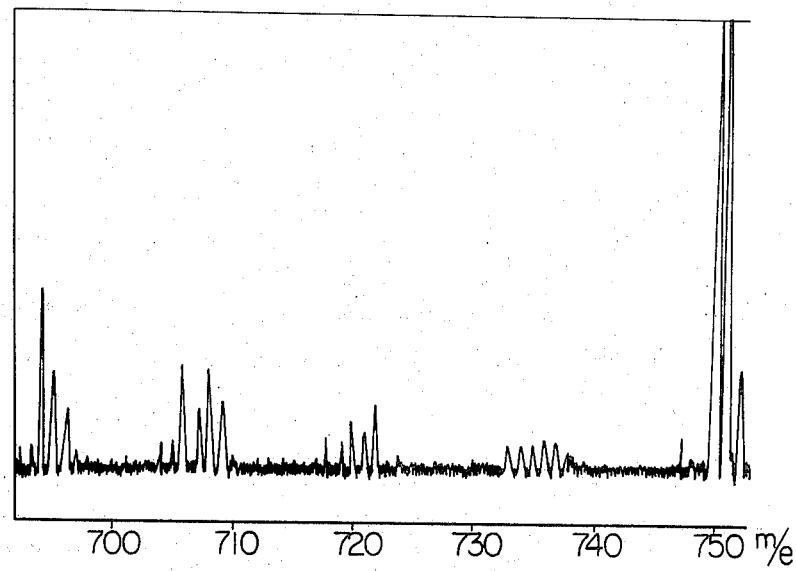
Fig. 2-p
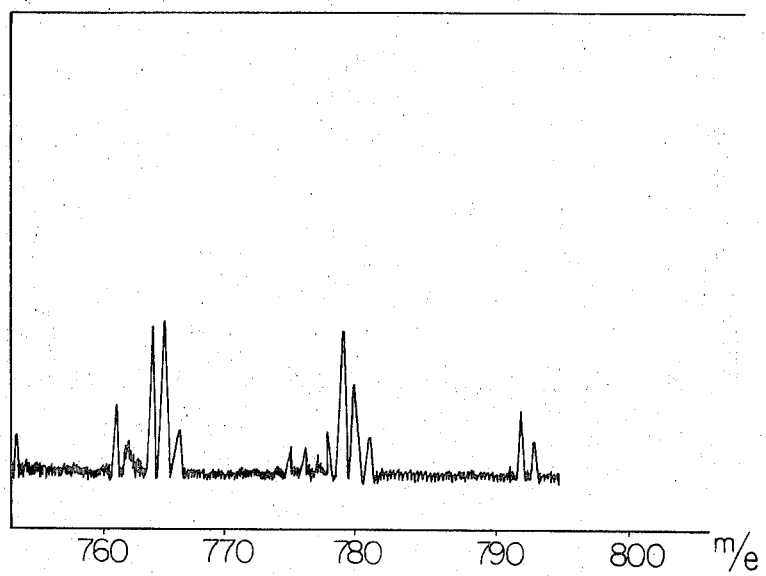

Fig. 3-a
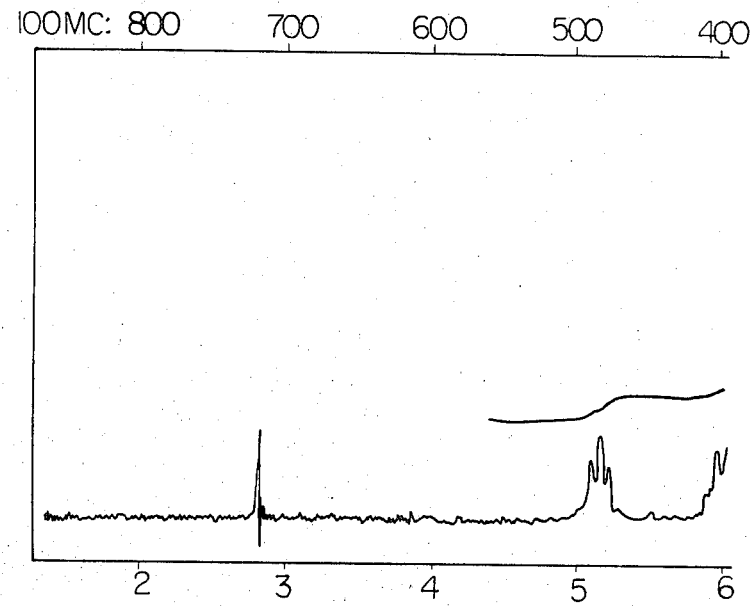
Fig. 3-b
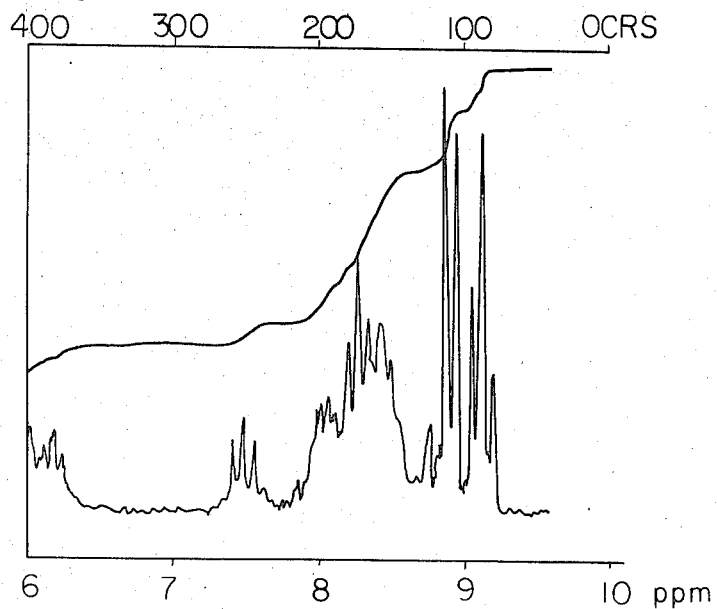

United States Patent Office 3,777,023
Patented Dec. 4, 1973

3,777,023
MACROTETROLIDE MITICIDE AND INSECTICIDE
Takao Sagawa, Seiji Hirano, and Nobuhiko Tanaka, Tokyo, and Kunihiko Togashi, Kashiwa, Japan, assignors to Chugai Saiyaku Kabushiki Kaisha, Tokyo, Japan
Filed Sept. 8, 1970, Ser. No. 70,042
Claims priority, application Japan, Sept. 6, 1969, 44/70,320; Feb. 24, 1970, 45/15,360
Int. Cl. A01n 9/36
U.S. Cl. 424—200       11 Claims

ABSTRACT OF THE DISCLOSURE

An agricultural composition comprising, as active ingredients, one or more macrotetrolide compounds represented by the formula

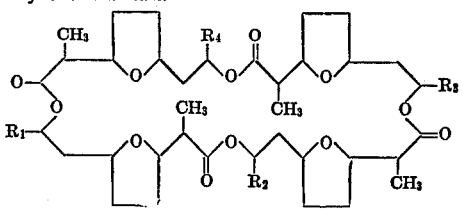

wherein $R_1$, $R_2$, $R_3$ and $R_4$ are each selected from the group consisting of methyl and ethyl, with or without containing one or more pesticides selected from the group consisting of organo-chloric pesticides, carbamate pesticides and organo-phosphorus pesticides is disclosed.

---

This invention relates to an agricultural composition. More particularly, it relates to an agricultural composition containing, as active ingredients, one or more of macrotetrolide compounds represented by the formula

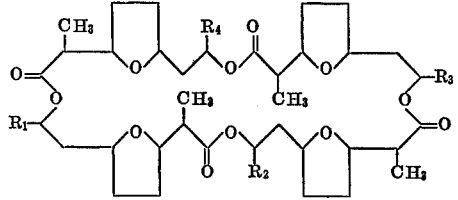

wherein $R_1$, $R_2$, $R_3$ and $R_4$ are each selected from the group consisting of methyl and ethyl group.

Generally, the preferred miticides must fulfill the following requirements:
(a) the miticides are those capable of being active on adult, larva and egg, since life cycle of mites is so short (2 to 3 weeks) that mites live in various stage, i.e. adult, larva and egg, at high population.
(b) the miticides are those capable of effectively controlling the drug-resistant mites;
(c) they must be of low toxicity against mammals and harmless to plants;
(d) they must not be adversely affect Pentatomidae, Thripidae and Coccinellidae which are natural enemies to mites.

Notwithstanding, the agents presently used do not satisfactorily fulfil the above requirements. For example, organo-chloric and organo-phosphorus pesticides are relatively inactive on drug-resistant mites, and the antibiotics such as cycloheximide, piericidine and the like give another question on toxicity to mammals and injury on plants.

Under such circumstances, the present inventors searched for the pesticides which completely satisfy the above requirements and found that the macrotetrolide compounds represented by the above formula would meet all the above requirements.

The compounds having the above formula used in the present invention are those listed in Table 1 below.

TABLE 1

| Compound | $R_1$ | $R_2$ | $R_3$ | $R_4$ | Melting point (° C.) |
|---|---|---|---|---|---|
| I | $CH_3$ | $CH_3$ | $CH_3$ | $CH_3$ | ~148 |
| II | $CH_3$ | $C_2H_5$ | $CH_3$ | $CH_3$ | 63–64 |
| III | $C_2H_5$ | $C_2H_5$ | $CH_3$ | $CH_3$ | 66.5–67.0 |
| IV | $C_2H_5$ | $C_2H_5$ | $C_2H_5$ | $CH_3$ | 68 |
| V | $C_2H_5$ | $C_2H_5$ | $C_2H_5$ | $C_2H_5$ | 105–106 |

Of these, the Compounds I through IV are known as described in Helvetica Chimica Acta, vol. 38, pp. 1445–1448 (1955); ibid, vol. 45, pp. 129–138 (1962); ibid, vol. 45, pp. 620–630 (1962) and others. The compound V is a novel compound which was not previously described in literature.

The physical and chemical properties and an embodiment for the preparation of the Compound V are illustrated as follows:

(A) PHYSICAL AND CHEMICAL PROPERTIES (1) Appearance and properties

Colorless or slightly yellowish prismatic crystals; melting point, 105–106° C.; neutral and very stable against heat and light.

(2) Solubility

Soluble in most of the organic solvents such as alcohols, acetone, benzene, n-hexane, chloroform, petroleum ether but hardly soluble in water.

(3) Elemental analysis

Composed of carbon, hydrogen and oxygen as constitutive elements and containing no nitrogen, sulfur and halogen, C, 65.41%; H, 9.13%.

(4) Infrared absorption spectrum

The spectrum, shown in FIGS. 1(a) and (b), is measured on a liquid film and shows absorptions at 3520, 3460, 2960, 2920, 2860, 1733, 1460, 1381, 1334, 1274, 1195, 1171, 1122, 1092, 1063, and 950 cm.$^{-1}$, indicating the presence of methyl radical, methylene radical, carbonyl, and carboxylic acid ester.

(5) Absorption spectrum of mass spectrometry

The spectrum is shown in FIGS. 2(a)–(p). Parent peak is observed at m/e 792.

(6) NMR spectrum

The spectrum, shown in FIGS. 3(a)–(b), is measured in duetero-chloroform. A triplet signal due to methyl of the ethyl radical is observed at $\tau=9.10$, and a signal due to the methyl group at $\tau=8.75$ disappears.

(7) Optical rotation $[\alpha]_D = 0$ (c.=1, in chloroform).

(8) Color reaction (a) Fehling, Tollens and Molish reactions are negative.
(b) Ferric chloride and Ninhydrine reactions are negative.
(c) Fischbach-Leben reaction is negative.

(B) PREPARATION

The novel compound used in the present invention shown in Table 1 as Compound V (hereinafter referred to "Compound V") is prepared by culturing a Compound V—producing strain belonging to genus Streptomyces in a chemically defined or natural culture medium and isolating the desired product from the mycelium in the usual manner. For example, Streptomyces No. 3466 strain which was newly isolated by the present inventors from the soil sample of Tsurugashima-cho, Iruma-gun, Saitama, Japan, can be used as a Compound V-producing strain. A culture of the above-identified strain has been deposited with Fermentation Research Institute, Japan, under the number FERM-P No. 233 (Oct. 7, 1968) and with the American Type Culture Collection in U.S.A. under the number ATCC 21428. Cultural characteristics of the No. 3466 strain are as follows:

(I) Morphological characteristics (1) Long and straight or wave-shaped sporophores which do not form a spiral.
(2) Spherical or oval spores, the dimension of which range from $0.7–0.8 \times 0.9–1.0\mu$.

(II) Cultural characteristics in various media

Observed after two weeks' cultivation at 25° C. The color determination was made according to the "Iro no Hyōjun" published by Nihon Shikisai Kenkyu-jo, Japan.

(1) Sucrose-nitrate agar medium:
   Growth: Slight growth
   Aerial mycelium: Slight and powdery growth, cream colored
   Soluble pigment: No production
(2) Glycerin-calcium malate agar medium:
   Growth: Cream-colored and good growth
   Aerial mycelium: Powdery and yellow-white
   Soluble pigment: Light brown
(3) Glucose-asparagine agar medium:
   Growth: Pale yellow and good growth
   Aerial mycelium: Powdery and yellow-white
   Soluble pigment: Light yellow
(4) Glycerin-asparagine agar medium:
   Growth: Good growth
   Aerial mycelium: Powdery growth, light yellow
   Soluble pigment: Light yellow brown
(5) Ordinal nutrient agar medium:
   Growth: Good growth
   Aerial mycelium: Pale yellow
   Soluble pigment: Light yellow-brown
(6) Bennet medium:
   Growth: Good growth, wrinkled and raised at center
   Aerial mycelium: Yellowish gray
   Soluble pigment: Dark yellow-brown
(7) Starch agar medium:
   Growth: Moderate growth, colorless
   Aerial mycelium: Yellow-white
   Soluble pigment: Light yellow-orange
(8) Potato medium:
   Growth: Good growth, yellow-brown, wrinkled
   Aerial mycelium: Light brown-gray
   Soluble pigment: Black
(9) Nitrate medium:
   Growth: Soft hair-like growth
   Other: Nitrate reduction; positive
(10) Gelatin agar medium:
   Growth: Growing in the surface
   Aerial mycelium: White
   Soluble pigment: Brown
   Other: Slow liquefaction and becomes crater-like
(11) Litmus milk medium:
   Growth: Good growth, ring is formed.
   Other: Weak coagulation and peptonization
(12) No invertase activity
(13) Starch-peptone agar medium:
   Growth: Good growth, wrinkled
   Aerial mycelium: Light yellow-brown
   Soluble pigment: Dark yellow-brown
(14) Cellulose-asparagine medium:
   No growth
   No hydrolysis
(15) Dextrin casein medium:
   Growth: Wrinkled, yellow-brown
   Aerial mycelium: Brown-white
   Soluble pigment: Dark yellow-brown From the cultural characteristics of No. 3466 strain as set forth above, it was identified by the inventors, by criteria given in "Bergey's Manual of Determinative Bacteriology" 7th edition, "The Actinomycetes" by S. A. Waksman and other literatures on the classification of actinomycetes, as a strain of *Streptomyces aureus*.

In preparing the Compound V by using the above No. 3466 strain, 10 l. of a medium consisting of 1% glucose, 2% glycerin, 0.2% peptone, 0.2% yeast extract, 0.2% meat extract, 2% soybean meal, 0.05% magnesium sulfate, 0.1% dipotassium hydrogenphosphate and 1% calcium carbonate is first charged into a jar fermentor and sterilized in the usual manner. The medium is then inoculated with 200 ml. of a seed liquid of No. 3466 strain which has been shake-cultured for 3 days at 27° C. in a medium having the same composition as above, and the microorganism is cultured for 4 days at 27° C. with aeration at a rate of 5 l. per minute while stirring at a rate of 250 r.p.m. The fine, pulp-like mycelium is separated by means of a centrifugator together with a De Laval type separator and extracted twice with 2 l. of acetone. The extract is concentrated under reduced pressure to distil off acetone, and the resulting concentrate is extracted twice with 1 l. of n-hexane. The latter extract is then concentrated under reduced pressure to distil off the n-hexane to yield an oily red-brown substance.

The thus obtained oily substance is then passed through a column of 25 x 300 mm. packed with about 100 g. of silica gel using n-hexane as a solvent, and the column is eluted with a mixture of the solvents consisting of n-hexane-ethyl acetate (9:1). The resulting eluate is concentrated under reduced pressure to obtain a light yellow oily substance. This oily substance is then allowed to stand in a freezer for a period of one week to give 2.0 g. of crude crystals.

700 mg. of the thus obtained crude crystals is dissolved in a solvent consisting of chloroform:ethyl acetate (1:1) and the resulting solution is subjected to a column of 30 mm. diameter and 500 mm. length packed with 120 g. of silica gel (particle diameter, less than 0.08 mm.). The column is then developed and eluted with 2 l. of the same solvent and the eluate is discarded. The column is further eluted with 1 l. of ethyl acetate and the eluate is concentrated in reduced pressure to remove the solvent to give the desired Compound V as a paste substance. The substance is dissolved in a small amount of n-hexane and the solution is allowed to stand at a temperature of $-10°$ C. to give prismatic crystals.

In the present invention, the macrotetrolide antibiotics designated as Compound I to Compound V in Table 1 can be used alone but are preferably used in a form of powder, granule, wettable powder, emulsion, oil, aerosol or the like in combination with the wide variety of carriers.

The carrier which can be used in the present invention includes, for example, clay, kaolin, talc, bentonite, diatomaceous earth, calcium carbonate, water, alcohols, xylene, benzene, acetone, air, carbon dioxide gas, or the like.

Further, adjuvants such as spreader, emulsifier, dispersing agent, wetting and spreading agent and other agents which are commonly employed in agricultural preparations may also be incorporated into the preparation of this invention.

In applying to the field, the macrotetrolide antibiotics of this invention or the composition thereof are preferably used in an amount of 50 to 200 g. (calculated as active ingredient) per 10 ares.

The macrotetrolide can be combined with the other pesticides such as miticides, insecticides, fungicides, herbicides and the like so as to enhance the effectiveness of the composition or broaden the extent of its application. Particularly, in combination with one or more of the pesticides such as organo-chloric insecticides and miticides; carbamate insecticides and fungicides; and organo-phosphorus insecticides, miticides and fungicides, the miticidal activity of the macrotetrolide compounds are synergistically increased as compared with that of the macrotetrolide compounds alone. Further, when they are combined with such pesticides having insecticidal or insect-and-miticidal activity, the composition may be beneficial one because insecticidal activity of the pesticides is also increased as well as the miticidal activity, as compared with those of each alone.

The pesticides which have been found to remarkably increase the miticidal activity of the macrotetrolides when used in combination include the organo-chloric compounds such as 1,1,1-trichloro-2,2-bis(p-chlorophenyl) ethane (DDT),
1,2,3,4,5,6-hexachlorocyclohexane (Lindane),
1,2,3,4,10,10-hexachloro-1,4,4a,5,8,8a-hexahydro-endo-1,4-exo-5,8-dimethanonaphthalene (aldrin),
p-chlorophenyl p-chlorobenzenesulfonate (CPCBS),
bis(p-chlorophenoxy)methane (DCPM),
1,1-bis(p-chlorophenyl)ethanol (BCPE),
2-(p-tert-butylphenoxy)-1-methylethyl 2-chloroethyl sulfite (Aramite),
p-chlorophenyl 2,4,5-trichlorophenylazo sulfide (CPAS),
bis(p-chlorophenyl) disulfide (DDDS),
ethyl p,p'-dichlorobenzilate(chlorobenzilate),
isopropyl p,p'-dichlorobenzilate(chloropropylate),
2,2,2-trichloro-1,1-bis(p-chlorophenyl)ethanol (Kelthane),
2,4,5,4'-tetrachlorodiphenyl sulfone (tetradifon),
2,4,5,4'-tetrachlorodiphenyl sulfide (Animert),
2-[2-(p-tert-butylphenoxy)-1-methylethoxy]-1-methylethyl 2-chloroethyl sulfite (PPPS),
2,5-dichloro-α-ethoxyimino-6-methoxybenzyl p-methylbenzoate (ETHO),
2,5-dichloro-6-methoxy-4'-methyl-N-ethoxydibenzamide (ETHN) and
2-chloro-4-methylthiophenyl methyl N-ethylphosphoroamidothionate (amidothionate),
N'-(4-chloro-o-tolyl)-N,N-dimethylformamidine (Chlorophenamidine);

the carbamate compounds such as 1-naphthyl methylcarbamate (NAC),
o-isopropoxyphenyl methylcarbamate (PHC),
o-chlorophenyl methylcarbamate (CPMC),
m-tolyl methylcarbamate (MTMC),
3,5-xylyl methylcarbamate (XMC),
O-tert-butylphenyl methylcarbamate (BPMC),
3,4-xylyl methylcarbamate (MPMC),
4-diallylamino-3,5-xylyl methylcarbamate (APC),
6-chloro-3,4-xylyl methylcarbamate (Carbanolate),
p-ethylthiophenyl methylcarbamate (EMPC),
zinc ethylene-bis(dithiocarbamate) (zineb) and
manganese ethylene-bis(dithiocarbamate) (maneb),
ammonium ethylene-bis(dithiocarbamate) (Amobam);

and the organo-phosphorus compounds dimethyl p-nitrophenyl phosphorothionate (parathion-methyl),
diethyl p-nitrophenyl phosphorothionate (parathion),
4-cyanophenyl dimethyl phosphorothionate (Cyanox),
dimethyl 4-methylthio-m-tolyl phosphorothionate (Baycid),
dimethyl 4-nitro-m-tolyl phosphorothionate (Sumithion),
diethyl 2,4-dichlorophenyl phosphorothionate (Nemacide),
diethyl 2-isopropyl-4-methyl-6-pyrimidinyl phosphorothionate (diazinon),
ethyl p-nitrophenyl phenylphosphorothionate (EPN),
p-cyanophenyl ethyl phenylphosphorothionate (Surecide),
2,4-dichlorophenyl ethyl phenylphosphorothionate (S-Seven),
S-[1,2-di(ethoxycarbonyl)-ethyl] dimethyl phosphorothiolothionate (malathon),
S-[α-(ethoxycarbonyl)benzyl]dimethyl phosphorothiolothionate (Papthion),
dimethyl S-(N-methylcarbamoylmethyl) phosphorothiolothionate (dimethoate),
S-(N-formyl-N-methylcarbamoylmethyl) dimethyl phosphorothiolothionate (Anthio),
S-(N-ethoxycarbonyl-N-methylcarbamoylmethyl) diethyl phosphorothiolothionate (Pestan),
S-(ethylsulfinylmethyl) diisopropyl phosphorothiolothionate (IPSP),
S-(2-acetylaminoethyl) dimethyl phosphorothiolothionate (Amiphos),
S-(ethylthioethyl) dimethyl phosphorothiolothionate (Ekatin),
diethyl S-(2-ethylthioethyl) phosphorothiolothionate (Di-Syston),
S-[(6-chloro-2-oxo-3-benzoxazolinyl)methyl] diethyl phosphorothiolothionate (Rubitox),
dimethyl S-(phthalimidomethyl) phosphorothiolothionate (Imidan),
S-[5-methoxy-2-oxo-2,3-dihydro-1,3,4-thiadiazolyl-(3)-methyl] dimethyl phosphorothiolothionate (Supracide),
S-[4,6-diamino-1,3,5-triazinyl-(2)-methyl] dimethyl phosphorothiolothionate (menazon),
S-(2-ethylthioethyl) dimethyl phosphorothiolate (Meta-Systox),
S-(2-ethylsulfinyl-1-methylethyl) dimethyl phosphorothiolate (Estox),
dimethyl S-[2-(1-methylcarbamoylethylthio)ethyl] phosphorothiolate (vamidothion),
dimethyl 2,2,2-trichloro-1-hydroxyethylphosphonate (Dipterex),
2,2-dichlorovinyl dimethyl phosphate (DDVP),
1,2-dibromo-2,2-dichloroethyl dimethyl phosphate (Dibrom),
2-chloro-1-(2,4-dichlorophenyl)vinyl diethyl phosphate (CVP),
tetraethyl pyrophosphate (TEPP),
tetraethyl S,S-methylene bis(phosphorothiolothionate) (ethion),
2-methoxy-4H-1,3,2-benzodioxaphosphorin-2-sulfide (Salithion),
2-chloro-4-methylthiophenyl methyl N-ethylphosphoroamidothionate (Mitemate),
S-2,5-dichlorophenylthiomethyl) diethyl phosphorothiolothionate (phenkapton),
S,S-1,4-dioxone-2,3-diyl bis(diethyl phosphorothiolothionate) (Delnav),
S-benzyl diisopropyl phosphorothiolate (Kitazin P),
S-benzyl ethyl phenylphosphorothiolate (Inezin),
O-ethyl diphenyl phosphorodithiolate (Hinosan).

These organo-chloric, carbamate and organo-phosphorus pesticides can be added to the macrotetrolide antibiotics in an amount corresponding to from ½ to ¼ by weight of the macrotetrolide antibiotics thereby obtaining satisfactory controlling effect at relatively little dose of the macrotetrolide antibiotics. That is, the macrotetrolide antibiotics alone are usually used in an amount of from 50 to 200 g. per 10 ares but when they are used in combination with one or more of the above pesticides, the amount of from 30 to 50 g. of said antibiotics per 10 ares will generally be sufficient. In this connection, the effect inherent to the pesticides incorporated (which are generally applied in an amount of 150 to 200 g. per 10 ares) will generally be exerted when the pesticides are used in an amount more than about 30 g. per 10 ares when they are used in combination with the macrotetrolide antibiotics.

The macrotetrolide compounds and one or more of the organo-chloric, carbamate and organo-phosphorus pesticides can be formulated into wettable powder, emulsion, oil, powder and the like, as previously described. Alternatively, the macrotetrolide compounds and the pesticide, as they are or in suitable formulations, may be blended each other instantaneously just before the use.

The present invention is further illustrated by the following experiments.

EXPERIMENT 1

Tests for activity on *Tetranychus telarius*

(i) Miticidal activity: The cotyledons of the kidney beans planted in pot of 6 cm. diameter were inoculated with 10 adult mites of *Tetranychus telarius* and sprayed with an emulsion (prepared in Example 1 below) which had been diluted to the predetermined concentrations as shown in Table 2. After being sprayed with the emulsion, the plants were kept in a thermostatic room at a temperature of 25° C. for 48 hours and investigated for the mortality of the mites.

(ii) Ovicidal activity: The cotyledons of the kidney beans planted in pot of 6 cm. diameter were inoculated with 20 adult mites of *Tetranychus telarius*, and the mites were laid eggs for 24 hours so as to regulate the stage of ova. The adult mites are then removed, and the ova were thoroughly sprayed with an emulsion (prepared in Example 1 below) which had been diluted to the predetermined concentration as shown in Table 2. After being sprayed with the emulsion, the plants were kept in a thermostatic room at a temperature of 25° C. for a week and investigated for the mortality of ovum.

The results obtained from the above tests are as shown in Table 2.

TABLE 2

| Miticide tested | Concentration of active ingredient | Mortality of— Adult mite (percent) | Ovum (percent) |
|---|---|---|---|
| Compound: | | | |
| I | 0.05 | 100 | 100 |
| | 0.005 | 90 | 74.3 |
| | 0.0005 | 54 | 35.9 |
| II | 0.05 | 100 | 100 |
| | 0.005 | 98 | 8.88 |
| | 0.0005 | 62 | 56.5 |
| III | 0.05 | 100 | 100 |
| | 0.005 | 100 | 98.6 |
| | 0.0005 | 77 | 51.3 |
| IV | 0.05 | 100 | 100 |
| | 0.005 | 100 | 100 |
| | 0.0005 | 100 | 60.5 |
| V | 0.1 | 100 | 100 |
| | 0.01 | 100 | 100 |
| | 0.001 | 84 | 52.8 |
| Acar (ethyl-4-,4'-dichloro benzilate as control) | 0.05 | 100 | 100 |
| | 0.005 | 98 | 84.2 |
| | 0.0005 | 23 | 18.3 |
| Untreated | | 0 | 3 | 1.3 |

EXPERIMENT 2

Tests for activity on *Panonychus ulmi*, *Tetranychus urticae* and *Tetranychus kanzawai*

Apple and peach leaves placed in a chamber were introduced with 20 adult mites of each of *P. ulmi* and *T. urticae* which are parasitic on apple and *T. kanzawai* which is parasitic on peach, each being collected from field. Tangle-foot was then applied to the edges of the inoculated leaves so as to prefent the mites from leaping and the leaves were thoroughly sprayed with a wettable powder (prepared in Example 2 below) which had been diluted to the predetermined concentration. After being sprayed, the thus treated leaves were placed on wet cotton mat in a glass vessel and incubated in a thermostatic room at a temperature of 25° C. for 48 hours and thereafter investigated for the mortality of the mites.

The results obtained are shown in Table 3 in terms of $LC_{50}$ (p.p.m.).

TABLE 3

| Compound tested | P. ulmi | T. urticae | T. kanzawai |
|---|---|---|---|
| Compound: | | | |
| I | 4.8 | 5.0 | 5.5 |
| II | 4.0 | 4.8 | 4.3 |
| III | 3.3 | 4.0 | 3.8 |
| IV | 2.5 | 3.5 | 3.5 |
| V | 3.0 | 4.0 | 3.5 |
| Acar | 8.8 | 9.4 | 6.9 |
| Phenkapton [1] | 10.4 | 15.3 | 96.5 |

[1] o,o-Diethyl-S-[(2,5-dichlorophenylmercapto)methyl]phosphorodithioate.

As is clear from the results of Experiments 1 and 2, the compounds represented by the above formula are remarkably effective for controlling the mites in adult, larval and ovum states, as well as the drug resistant mites (*T. kanzawai* used in Experiment 2 is a species resistant to Phenkapton). Further, these compounds are excellent because of their low toxicity in mammals ($LD_{50}$ being more than 500 mg./kg. as determined in mice, p.o.) and not harmful to plants.

EXPERIMENT 3

Test for miticidal activity on *Tetranychus urticas* (composition of macrotetrolide compounds and organochloric pesticides)

The leaves of the pot-planted kidney beans were inoculated with 100 adult mites of *Tetranychus urtica* (phosphoric acid-resistant species) and thereafter sprayed with each of the composition prepared in Examples 9 to 21. The plants were kept in a thermostatic room at a temperature of 25° C. for 48 hours and investigated for the mortality of the mites. The results obtained are as shown in Table 4, with those of the comparative compounds.

TABLE 4

Miticidal activity against *Tetranychus telarius*

| | Percent concentration of total active ingredient of macrotetrolide antibiotics plus organochloric pesticides | | | |
|---|---|---|---|---|
| | 0.001 | 0.0005 | 0.0002 | 0.0001 |
| | Percent mortality | | | |
| Control | 0 | 0 | 0 | 0 |
| CPCBS | 2.4 | 0 | 0 | 0 |
| DCPM | 14.2 | 3.8 | 0 | 0 |
| BCPE | 20.4 | 2.5 | 0 | 0 |
| Aramite | 24.5 | 1.8 | 0 | 0 |
| CPAS | 6.2 | 0 | 0 | 0 |
| DDDS | 10.2 | 0 | 0 | 0 |
| Chlorobenzilate | 24.6 | 5.2 | 0 | 0 |
| Chloropropylate | 31.5 | 6.3 | 0 | 0 |
| Kelthane | 62.3 | 32.5 | 15.1 | 2.4 |
| Tetradifon | 4.3 | 2.4 | 0 | 0 |
| Animert | 5.8 | 1.5 | 0 | 0 |
| PPPS | 11.5 | 3.2 | 0 | 0 |
| Chlorophenamidine | 4.8 | 1.4 | 0 | 0 |
| Compound: | | | | |
| I | 71 | 39 | 12 | 5 |
| II | 75 | 42 | 18 | 8 |
| III | 82 | 51 | 23 | 12 |
| IV | 89 | 54 | 31 | 18 |
| V | 91 | 55 | 32 | 19 |
| Example: | | | | |
| 9 | 100 | 94.2 | 63.5 | 41.3 |
| 10 | 100 | 91.2 | 60.3 | 32.5 |
| 11 | 100 | 93.6 | 61.4 | 40.5 |
| 12 | 100 | 98.3 | 52.8 | 31.5 |
| 13 | 100 | 81.4 | 62.6 | 51.4 |
| 14 | 100 | 85.3 | 58.6 | 34.2 |
| 15 | 100 | 98.6 | 72.3 | 50.2 |
| 16 | 100 | 93.2 | 62.5 | 50.3 |
| 17 | 100 | 100 | 78.5 | 58.4 |
| 18 | 100 | 92.8 | 40.3 | 28.6 |
| 19 | 100 | 93.2 | 51.6 | 38.0 |
| 20 | 100 | 100 | 70.2 | 44.4 |
| 21 | 100 | 98.4 | 62.3 | 48.5 |

EXPERIMENT 4

Test for miticidal activity on *Tetranychus telarius* (composition of macrotetrolide compounds and carbamate pesticides)

Test procedure: The leaves of pot-planted kidney beans were inoculated with 100 adult mites of *Tetranychus telarius* and thereafter thoroughly sprayed with each of the wettable powders (prepared in Examples 22, 23, 24, 25 and 26) and the emulsion (prepared in Examples 27, 28, 29, 30 and 31), each being diluted with water to the predetermined concentrations as shown in Table 5. The plants thus sprayed were kept in a thermostatic room at 25° C. for 48 hours and investigated for the mortality of the mites.

The results are as shown in Table 5.

EXPERIMENT 5

Test for insecticidal activity on *Myzus persicae* (composition of macrotetrolide compounds and carbamate pesticides)

Test procedure: The leaves of pot-planted young egg plant were inoculated with *Myzus persicae* and thereafter thoroughly sprayed with each of the wettable powders (prepared in Examples 22, 23, 24, 25 and 26) and the emulsion (prepared in Examples 27, 28, 29, 30 and 31), each being diluted with water to the predetermined concentrations as shown in Table 6. The plants thus sprayed were kept in a thermostatic room at 25° C. for 24 hours and investigated for percent mortality in number of the mites as compared with that prior to the spraying. The results are as shown in Table 6.

TABLE 5

Miticidal activity on *Tetranychus telerius*

| | Percent total concentration of macrotetrolide antibiotics plus carbamate pesticides | | | |
|---|---|---|---|---|
| | 0.001 | 0.0005 | 0.0002 | 0.0001 |
| Agent | Percent mortality | | | |
| Control | 0 | 0 | 0 | 0 |
| Compound: | | | | |
| III | 82 | 51 | 23 | 12 |
| IV | 89 | 54 | 31 | 18 |
| V | 91 | 55 | 32 | 19 |
| II | 75 | 42 | 18 | 8 |
| I | 71 | 39 | 12 | 5 |
| NAC | 0 | 0 | 0 | 0 |
| PHC | 0 | 0 | 0 | 0 |
| BPMC | 0 | 0 | 0 | 0 |
| APC | 0 | 0 | 0 | 0 |
| MTMC | 0 | 0 | 0 | 0 |
| XMC | 0 | 0 | 0 | 0 |
| CPMC | 0 | 0 | 0 | 0 |
| Carbanolate | 0 | 0 | 0 | 0 |
| Maneb | 0 | 0 | 0 | 0 |
| Zineb | 0 | 0 | 0 | 0 |
| Example: | | | | |
| 22 | 100 | 100 | 92 | 76 |
| 23 | 100 | 100 | 83 | 64 |
| 24 | 100 | 95 | 72 | 51 |
| 25 | 100 | 84 | 63 | 44 |
| 26 | 100 | 98 | 86 | 64 |
| 27 | 100 | 100 | 93 | 78 |
| 28 | 100 | 96 | 82 | 53 |
| 29 | 100 | 100 | 91 | 52 |
| 30 | 100 | 85 | 72 | 61 |
| 31 | 100 | 84 | 70 | 43 |
| 32 | 100 | 84.5 | 72 | 55 |

TABLE 6

Insecticidal activity against *Myzus persigae*

| | Percent total concentration of macrotetrolide antibiotics plus carbamate pesticides | | | |
|---|---|---|---|---|
| | 0.005 | 0.002 | 0.002 | 0.0005 |
| Agent | Percent mortality | | | |
| Control | 0 | 0 | 0 | 0 |
| Compound: | | | | |
| III | 40.5 | 10.5 | 5.3 | 0 |
| IV | 42.6 | 12.4 | 5.6 | 0 |
| V | 51.8 | 13.6 | 6.4 | 0 |
| I | 38.8 | 10.2 | 3.6 | 0 |
| II | 32.4 | 9.4 | 2.4 | 0 |
| NAC | 62.8 | 31.4 | 10.1 | 4.2 |
| PNC | 60.5 | 30.8 | 9.8 | 3.1 |
| BMPC | 63.4 | 32.5 | 12.3 | 5.0 |
| APC | 52.1 | 30.4 | 9.6 | 2.3 |
| MTMC | 58.5 | 29.5 | 5.1 | 0 |
| CPMC | 42.3 | 23.0 | 8.5 | 0 |
| Carbanolate | 53.3 | 20.4 | 6.8 | 0 |
| Maneb | 0 | 0 | 0 | 0 |
| Zineb | 0 | 0 | 0 | 0 |
| Example: | | | | |
| 22 | 100 | 92.4 | 61.5 | 25.3 |
| 23 | 100 | 86.5 | 59.2 | 20.1 |
| 24 | 100 | 90.3 | 60.0 | 23.3 |
| 25 | 88.8 | 50.6 | 24.5 | 12.5 |
| 26 | 84.5 | 50.1 | 23.8 | 10.4 |
| 27 | 100 | 88.5 | 54.0 | 20.5 |
| 28 | 100 | 90.3 | 61.2 | 18.8 |
| 29 | 100 | 80.0 | 62.5 | 26.4 |
| 30 | 78.6 | 60.3 | 30.1 | 17.4 |
| 31 | 72.3 | 58.4 | 24.4 | 10.0 |
| 32 | 75.0 | 59.0 | 28.8 | 15.5 |

EXPERIMENT 6

Test for miticidal activity on *Tetranychus urticae* (composition of macrotetrolide antibiotics and organo-phosphorus pesticides)

The leaves of pot-planted kidney beans were inoculated with 100 adult mites of *Tetranychus urticae* and then thoroughly sprayed with each of the emulsions (prepared in Examples 33, 34, 35, 36, 37, 38, 39, 40, 41 and 42) and the wettable powders (prepared in Examples 43, 44, 45, 46, 47 and 48), each being diluted with water to the predetermined concentrations as shown in Table 7. The plants thus sprayed were kept in a thermostatic room at a temperature of 25° C. for 48 hours and investigated for the mortality of the mites.

The results are as shown in Table 7.

TABLE 7

| | Percent total concentration of macrotetrolide antibiotics plus carbamate pesticides | | | |
|---|---|---|---|---|
| | 0.001 | 0.0005 | 0.0002 | 0.0001 |
| Agent | Percent mortality | | | |
| Control | 0 | 0 | 0 | 0 |
| Compound: | | | | |
| I | 78 | 36 | 14 | 6 |
| II | 80 | 51 | 23 | 10 |
| III | 84 | 53 | 26 | 12 |
| IV | 88 | 54 | 27 | 15 |
| V | 90 | 55 | 27 | 18 |
| Cyanox | 12 | 6 | 0 | 0 |
| Baycid | 14 | 2 | 0 | 0 |
| Sumithion | 13 | 3 | 0 | 0 |
| Diazinon | 17 | 4 | 0 | 0 |
| EPN | 52 | 21 | 6 | 0 |
| Surecide | 12 | 0 | 0 | 0 |
| Papthion | 25 | 11 | 0 | 0 |
| Dimethoate | 40 | 18 | 0 | 0 |
| Pestan | 15 | 5 | 0 | 0 |
| Imidan | 51 | 23 | 6 | 0 |
| Estox | 36 | 4 | 0 | 0 |
| Vamidothion | 15 | 0 | 0 | 0 |
| DDVP | 24 | 8 | 0 | 0 |
| Ethion | 33 | 12 | 0 | 0 |
| Salithion | 42 | 14 | 0 | 0 |
| Kitazin P | 0 | 0 | 0 | 0 |
| Example: | | | | |
| 33 | 100 | 93 | 65 | 32 |
| 34 | 100 | 94 | 73 | 45 |
| 35 | 100 | 98 | 72 | 51 |
| 36 | 100 | 92 | 64 | 49 |
| 37 | 100 | 100 | 92 | 72 |
| 38 | 100 | 88 | 54 | 38 |
| 39 | 100 | 100 | 91 | 75 |
| 40 | 100 | 100 | 85 | 51 |
| 41 | 100 | 86 | 62 | 33 |
| 42 | 100 | 100 | 90 | 64 |
| 43 | 100 | 100 | 94 | 44 |
| 44 | 100 | 92 | 72 | 31 |
| 45 | 100 | 100 | 86 | 58 |
| 46 | 100 | 100 | 91 | 62 |
| 47 | 100 | 100 | 83 | 53 |
| 48 | 100 | 82 | 51 | 28 |

EXPERIMENT 7

Test for insecticidal activity on *Myzus persicae* (composition of macrotetrolide antibiotics and organo-phosphorus pesticides)

*Myzus persicae* on pot-planted young eggplant was thoroughly sprayed with each of the emulsions (prepared in Examples 35, 36, 38, 39 and 42) and the wettable powders (prepared in Examples 43, 44, 45, 46 and 48), each being diluted with water to the predetermined concentrations as shown in Table 8. The eggplant was kept in a thermostatic room at a temperature of 25° C. for 24 hours and investigated for the percent mortality in number of the insects. The results obtained are as shown in Table 8.

TABLE 8

Insecticidal activity against *Myzus persicae*

| Agent | Percent total concentration of active ingredients of macrotetrolide antibiotics plus organo-phosphorus pesticides | | | |
|---|---|---|---|---|
| | 0.004 | 0.001 | 0.0005 | 0.0002 |
| | Percent mortality | | | |
| Control | 0 | 0 | 0 | 0 |
| Compound: | | | | |
| III | 36.5 | 5.3 | 0 | 0 |
| IV | 33.4 | 5.6 | 0 | 0 |
| V | 38.6 | 6.4 | 0 | 0 |
| I | 29.2 | 3.6 | 0 | 0 |
| II | 29.4 | 2.4 | 0 | 0 |
| Sumithion | 52.4 | 24.8 | 5.8 | 0 |
| Diazinon | 51.2 | 19.4 | 2.4 | 0 |
| Surecide | 43.5 | 18.6 | 3.1 | 0 |
| Papthion | 60.5 | 30.4 | 10.1 | 0 |
| Imidan | 42.4 | 21.3 | 2.4 | 0 |
| Estox | 52.6 | 20.6 | 3.8 | 0 |
| Vamidothion | 34.5 | 6.3 | 0 | 0 |
| DDVP | 50.3 | 18.8 | 6.5 | 0 |
| Salithion | 44.8 | 11.1 | 0 | 0 |
| Kitazin P | 0 | 0 | 0 | 0 |
| Example; | | | | |
| 35 | 100 | 91.5 | 62.5 | 24.5 |
| 36 | 100 | 82.4 | 60.8 | 12.9 |
| 37 | 100 | 72.9 | 54.2 | 6.8 |
| 38 | 100 | 90.5 | 53.8 | 10.4 |
| 42 | 100 | 88.6 | 45.5 | 12.4 |
| 43 | 100 | 81.4 | 62.1 | 22.5 |
| 44 | 100 | 77.5 | 44.5 | 13.8 |
| 45 | 100 | 76.5 | 32.1 | 9.2 |
| 46 | 100 | 80.0 | 38.8 | 4.5 |
| 48 | 76.5 | 52.0 | 12.4 | 0 |

The present invention is further illustrated by the following examples, but the invention is not limited to the specific formulations and compounds as indicated in these examples. The percentage and the part used in examples are given by weight.

EXAMPLE 1

30 parts of Compound I was dissolved in a mixture of 18 parts of isopropyl alcohol and 42 parts of xylol, and to this were added 10 parts of a mixture of polyethylenenonylphenyl ether and calcium alkylbenzenesulfonate to prepare an emulsion. The resulting preparation can appropriately be diluted with water when it is applied.

EXAMPLE 2

4.5 parts of sodium lignin sulfonate, 3.0 parts of white carbon and 52.5 parts of clay were added to 40 parts of Compound II to prepare a wettable powder. The resulting preparation can appropriately be diluted with water when it is applied.

EXAMPLE 3

To 5 parts of Compound III were added 1.5 parts of sodium dodecylbenzenesulfonate followed by 38 parts of diatomaceous earth and 55.5 parts of bentonite, and the mixture was made granules. The resulting preparation can be applied as it is.

EXAMPLE 4

0.05 parts of Compound I was dissolved in 5 ml. of methyl alcohol, and the total volume was made up to 100 ml. with a mixed gas of Freon 35 and Freon 65 and the resulting preparation was filled in a can from which it can be applied by spraying.

EXAMPLE 5

20 parts of Compound V were dissolved in a mixture of 18 parts of isopropyl alcohol and 52 parts of xylol, and to this were added 10 parts of a mixture of polyoxyethylenenonylphenyl ether and calcium alkylbenzene sulfonate to prepare an emulsion which can appropriately be diluted with water when it is applied.

EXAMPLE 6

4.5 parts of sodium lignin sulfonate, 3.0 parts of white carbon and 2.5 parts of clay were added to 50 parts of Compound V to prepare a wettable powder which can appropriately be diluted with water when it is applied.

EXAMPLE 7

To 5 parts of Compound V were added 1.5 parts of sodium dodecylbenzenesulfonate followed by 38 parts of diatomaceous earth and 55.5 parts of bentonite, and the mixture was made granules. The resulting preparation can be applied as it is.

EXAMPLE 8

0.05 parts of Compound V was dissolved in 5 ml. of methyl alcohol, and the total volume was made up to 100 ml. with a mixed gas of Freon 35 and Freon 65 and the resulting preparation was filled in a can from which it can be applied by spraying.

EXAMPLE 9

Emulsion: Percent
- Compound I _____ 20
- CPCBS _____ 20
- Newkalgen 2115–PO (available from Takemoto Oil & Fat Co. Ltd., Japan) _____ 15
- Xylol _____ 45

EXAMPLE 10

Emulsion: Percent
- Compound II _____ 30
- PCPM _____ 10
- Newkalgen 2115–PO (available from Takemoto Oil & Fat Co. Ltd., Japan) _____ 15
- Xylol _____ 45

EXAMPLE 11

Emulsion: Percent
- Compound III _____ 40
- BCPE _____ 10
- Newkalgen 2115–PO (available from Takemoto Oil & Fat Co. Ltd., Japan) _____ 15
- Xylol _____ 35

EXAMPLE 12

Emulsion: Percent
- Compound IV _____ 35
- Aramaite _____ 15
- Newklagen 2115–PO (available from Takemoto Oil & Fat Co. Ltd., Japan) _____ 15
- Xylol _____ 35

EXAMPLE 13

Emulsion: Percent
- Compound V _____ 20
- CPAS _____ 20
- Dimethylformamide _____ 15
- Newkalgen 2115–PO (available from Takemoto Oil & Fat Co. Ltd., Japan _____ 15
- Xylol _____ 30

EXAMPLE 14

Emulsion: Percent
- Compound I _____ 25
- DDDS _____ 15
- Dimethylformamide _____ 25
- Newkalgen 2115–PO (available from Takemoto Oil & Fat Co. Ltd., Japan) _____ 15
- Xylol _____ 20

EXAMPLE 15

Emulsion: Percent
- Compound II _____ 25
- Chlorobenzylate _____ 15
- Dimethylformamide _____ 25
- Newkalgen 2115–PO (available from Takemoto Oil & Fat Co. Ltd., Japan) _____ 15
- Xylol _____ 20

EXAMPLE 16

Emulsion: Percent
- Compound III _____ 30
- Chloropropylate _____ 10
- Dimethylformamide _____ 25
- Newkalgen 1151 (available from Takemoto Oil & Fat Co. Ltd., Japan) _____ 15
- Xylol _____ 20

EXAMPLE 17

Emulsion: Percent
- Compound IV — 30
- Kelthane — 10
- Dimethylformamide — 25
- Newkalgen 1151 (available from Takemoto Oil & Fat Co. Ltd., Japan) — 15
- Xylol — 20

EXAMPLE 18

Wettable powder: Percent
- Compound V — 30
- Tetradifon — 20
- Polyvinyl alcohol — 2
- Sodium lignin sulfonate — 10
- Clay — 38

EXAMPLE 19

Wettable powder: Percent
- Compound I — 25
- Animert — 25
- Polyvinyl alcohol — 2
- Sodium lignin sulfonate — 10
- Clay — 38

EXAMPLE 20

Wettable powder: Percent
- Compound II — 40
- PPPS — 10
- Sodium lignin sulfonate — 14
- Polyoxyethylene alkylphenyl ether — 2
- White carbon — 2
- Diatomaceous earth — 2
- Clay — 30

EXAMPLE 21

Wettable powder: Percent
- Compound III — 30
- Chlorophenamidine — 20
- Sodium lignin sulfonate — 14
- Polyoxyethylene alkylphenyl ether — 2
- White carbon — 4
- Clay — 30

EXAMPLE 22

Wettable powder: Percent
- Compound III — 40
- NAC — 10
- Newkalgen NX-131 (available from Takemoto Oil & Fat Co. Ltd., Japan) — 5
- Clay — 45

EXAMPLE 23

Wettable powder: Percent
- Compound IV — 30
- PHC — 20
- Polyvinyl alcohol — 2
- Sodium lignin sulfonate — 10
- Clay — 38

EXAMPLE 24

Wettable powder: Percent
- Compound V — 25
- BPMC — 25
- Sodium lignin sulfonate — 2.5
- Polyoxyethylene alkylphenyl ether — 2.5
- White carbon — 2.0
- Diatomaceous earth — 25
- Clay — 18

EXAMPLE 25

Wettable powder: Percent
- Compound I — 25
- APC — 25
- Sodium lignin sulfonate — 2.5
- Polyoxyethylene alkylphenyl ether — 2.5
- White carbon — 2.0
- Clay — 43

EXAMPLE 26

Wettable powder: Percent
- Compound II — 25
- Maneb — 25
- Polyvinyl alcohol — 2
- Sodium dodecylbenzenesulfone — 5
- Clay — 43

EXAMPLE 27

Emulsion: Percent
- Compound III — 30
- MTMC — 10
- Dimethylformamide — 25
- Newkalgen 1151 (available from Takemoto Oil & Fat Co. Ltd., Japan) — 15
- Xylol — 20

EXAMPLE 28

Emulsion: Percent
- Compound IV — 20
- XMC — 20
- Dimethylformamide — 25
- Newkalgen 1151 (available from Takemoto Oil & Fat Co. Ltd., Japan) — 15
- Xylol — 20

EXAMPLE 29

Emulsion: Percent
- Compound V — 30
- CPMC — 10
- Dimethylformamide — 25
- Newkalgen 1151 (available from Takemoto Oil & Fat Co. Ltd., Japan) — 15
- Xylol — 20

EXAMPLE 30

Emulsion: Percent
- Compound I — 20
- Carbanolate — 20
- Dimethylformamide — 25
- Newkalgen 1151 (available from Takemoto Oil & Fat Co. Ltd., Japan) — 15
- Xylol — 20

EXAMPLE 31

Emulsion: Percent
- Compound II — 20
- Zineb — 20
- Dimethylformamide — 25
- Newkalgen 1151 (available from Takemoto Oil & Fat Co. Ltd., Japan) — 15
- Xylol — 20

EXAMPLE 32

Powder: Percent
- Compound IV — 2
- MPMC — 1
- White carbon — 2
- Clay — 95

EXAMPLE 33

Emulsion: Percent
- Compound I — 30
- Cyanox — 10
- Newkalgen 1151 (available from Takemoto Oil & Fat Co. Ltd., Japan) — 15
- Xylol — 45

EXAMPLE 34

Emulsion: Percent
- Compound II — 30
- Baycid — 10
- Newkalgen (available from Takemoto Oil & Fat Co., Ltd., Japan) — 15
- Xylol — 45

EXAMPLE 35
Emulsion: Percent
- Compound III --- 25
- Sumithion --- 15
- Newkalgen 1151 (available from Takemoto Oil & Fat Co. Ltd., Japan) --- 15
- Xylol --- 45

EXAMPLE 36
Emulsion: Percent
- Compound IV --- 25
- Diazinon --- 15
- Newkalgen 1151 (available from Takemoto Oil & Fat Co. Ltd., Japan) --- 15
- Xylol --- 45

EXAMPLE 37
Emulsion: Percent
- Compound V --- 20
- EPN --- 20
- Newkalgen 1151 (available from Takemoto Oil & Fat Co. Ltd., Japan) --- 15
- Xylol --- 45

EXAMPLE 38
Emulsion: Percent
- Compound I --- 20
- Surecide --- 20
- Newkalgen 1151 (available from Takemoto Oil & Fat Co. Ltd., Japan) --- 15
- Xylol --- 45

EXAMPLE 39
Emulsion: Percent
- Compound II --- 30
- Papthion --- 10
- Newkalgen 1151 (available from Takemoto Oil & Fat Co. Ltd., Japan) --- 15
- Xylol --- 45

EXAMPLE 40
Emulsion: Percent
- Compound III --- 30
- Dimethoade --- 10
- Newkalgen 1151 (available from Takemoto Oil & Fat Co. Ltd., Japan) --- 15
- Xylol --- 45

EXAMPLE 41
Emulsion: Percent
- Compound IV --- 25
- Pestan --- 15
- Newkalgen 1151 (available from Takemoto Oil & Fat Co. Ltd., Japan) --- 15
- Xylol --- 45

EXAMPLE 42
Emulsion: Percent
- Compound V --- 25
- Imidan --- 15
- Newkalfien 1151 (available from Takemoto Oil & Fat Co. Ltd., Japan) --- 15
- Xylol --- 45

EXAMPLE 43
Wettable powder: Percent
- Compound I --- 40
- Estox --- 10
- Polyvinyl alcohol --- 2
- Sodium lignin sulfonate --- 10
- Clay --- 38

EXAMPLE 44
Wettable powder: Percent
- Compound II --- 30
- Vamidothion --- 20
- Polyvinyl alcohol --- 2
- Sodium lignin sulfonate --- 10
- Clay --- 38

EXAMPLE 45
Wettable powder: Percent
- Compound III --- 40
- DDVP --- 10
- Dodecylbenzenesulfonic acid --- 5
- Dode__cylbenzenesulfonic acid --- 5
- Clay --- 43

EXAMPLE 46
Wettable powder: Percent
- Compound IV --- 30
- Ethion --- 10
- Polyvinyl alcohol --- 2
- Dodecylbenzenesulfonic acid --- 5
- Clay --- 53

EXAMPLE 47
Wettable powder: Percent
- Compound V --- 25
- Salithion --- 15
- Sodium lignin sulfonate --- 10
- Polyoxyethylene alkylphenyl ether --- 2
- White carbon --- 2
- Clay --- 46

EXAMPLE 48
Wettable powder: Percent
- Compound IV --- 20
- Kitazin P --- 20
- Sodium lignin sulfonate --- 10
- Polyoxyethylene alkylphenyl ether --- 2
- White carbon --- 2
- Diatomaceous earth --- 20
- Clay --- 26

EXAMPLE 49
Powder: Percent
- Compound V --- 2
- Phenkapton --- 1
- White carbon --- 2
- Clay --- 95

BRIEF DESCRIPTION OF THE DRAWINGS

FIGS. 1(a) and (b) illustrate an infrared absorption spectrum of the Compound V.

FIGS. 2(a)–(p) illustrate an absorption spectrum of mass spectrometry of the Compound V.

FIGS. 3(a) and (b) illustrate an NMR spectrum of the Compound V.

Details concerning carries and other adjuvants used in the formulations of the present invention can in particular be found in the following works:

Fryer and Evans: Wood Control Handbook, 5th edition, page 101 et seq.

D. H. Frear "Chemistry of the Pesticides," 3rd edition, edited by Academic Press, pages 409 to 433.

H. Martin "The Scientific Principles of Crop Protection," edited by E. Arnold in London, pages 60 to 84.

It will be obvious to those skilled in the art that various changes may be made without departing from the scope of the invention and the invention is not to be considered limited to what is shown in the drawings and described in the specification.

We claim:
1. An insecticidal and miticidal composition for eradicating mites and insects, comprising an insecticidal and miticidal carrier;

a macrotetrolide compound, in an amount effective to eradicate mites and insects, of the formula

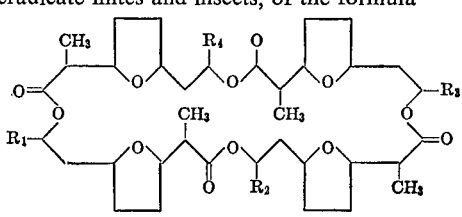

wherein $R_1$, $R_2$, $R_3$ and $R_4$ are each selected from the group consisting of methyl and ethyl; and
an effective amount of an organo-chloric compound selected from the group consisting of 1,1,1-tri-chloro-2,2-bis(p-chlorophenyl)ethane;
1,2,3,4,5,6-hexachlorocyclohexane;
1,2,3,4,10,10-hexachloro-1,4,4a,5,8,8a-hexahydro-endo-1,4-exo-5,8-dimethanonaphthalene;
p-chlorophenyl p-chloro-benzenesulfonate;
bis(p-chlorophenoxy)methane;
1,1-bis(p-chlorophenyl)ethanol;
2-p-tert-butylphenoxy)-1-methylethyl 2-chloroethyl sulfite;
p-chlorophenyl 2,4,5-trichlorophenylazo sulfide;
bis(p-chlorophenyl) disulfide;
ethyl p,p'-dichlorobenzilate;
isopropyl p,p'-dichlorobenzilate;
2,2,2-trichloro-1,1-bis(p-chlorophenyl)ethanol;
2,4,5,4'-tetrachlorodiphenyl sulfone;
2,4,5,4'-tetrachlorodiphenyl sulfide;
2-[2-(p-tert-butylphenoxy)-1-methylethoxy]-1-methylethyl 2-chloroethyl sulfite;
2,5-dichloro-α-ethoxyimino-6-methyoxybenzyl p-methylbenzoate;
2,5-dichloro-6-methoxy-4'-methyl-N-ethoxydibenzamide;
2-chloro-4-methylthiophenyl methyl N-ethylphosphoroamidothionate and
N'-(4-chloro-o-tolyl)-N,N-dimethylformamidine.

2. The insecticidal and miticidal composition according to claim 1, wherein said organo-chloric compound is present in an amount corresponding to ½–¼ by weight of said macrotetrolide compound.

3. A method for eradicating mites and insects which comprises applying the composition according to claim 1 to plants in an amount sufficient to kill mites and insects.

4. An insecticidal and miticidal composition for eradicating mites and insects, comprising an insecticidal and miticidal carrier;
a macrotetrolide compound, in an amount effective to eradicate mites and insects, of the formula

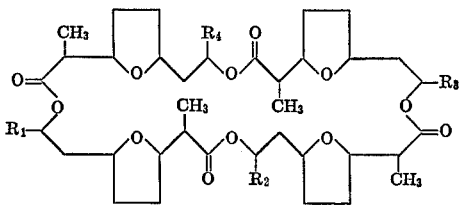

wherein $R_1$, $R_2$ and $R_3$ are each selected from the group consisting of methyl and ethyl, and
an effective amount of a carbamate compound selected from the group consisting of 1-naphthyl methylcarbamate;
o-isopropoxyphenyl methylcarbamate;
o-chlorophenyl methylcarbamate;
m-tolyl methylcarbamate;
3,5-xylyl methylcarbamate;
o-tert-butylphenyl methylcarbamate;
3,4-xylyl methylcarbamate;
4-diallylamino-3,5-xylyl methylcarbamate;
6-chloro-3,4-xylyl methylcarbamate;
p-ethylthiophenyl methylcarbamate;
zinc ethylene-bis(dithiocarbamate);
manganese ethylene-bis(dithiocarbamate); and
ammonium ethylene-bis(dithiocarbamate).

5. The insecticidal and miticidal composition according to claim 4, wherein said carbamate compound is present in an amount corresponding to ½–¼ by weight of said macrotetrolide compound.

6. A method for eradicating mites and insects comprises applying the composition according to claim 4 to plants in an amount sufficient to kill mites and insects.

7. An insecticidal and miticidal composition for eradicating mites and insects comprising an insecticidal and miticidal carrier:
a macrotetrolide compound in an amount effective for eradicating mites and insects of the formula

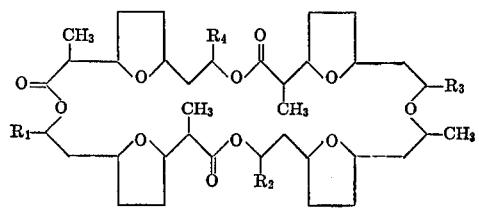

wherein $R_1$, $R_2$, $R_3$ and $R_4$ are each selected from the group consisting of methyl and ethyl, and
an effective amount of an organo-phosphorus compound selected from the group consisting of dimethyl p-nitrophenyl phosphorothionate;
diethyl p-nitrophenyl phosphorothionate;
4-cyanophenyl dimethyl phosphorothionate;
dimethyl 4-methylthio-m-tolyl phosphorothionate;
dimethyl 4-nitro-m-tolyl phosphorothionate;
diethyl 2,4-dichlorophenyl phosphorothionate;
diethyl 2-isopropyl-4-methyl-6-pyrimidinyl phosphorothionate;
ethyl p-nitrophenyl phenyl-phosphorothionate;
p-cyanophenyl ethyl phenyl-phosphorothionate;
2,4-dichlorophenyl ethyl phenyl phosphorothionate;
S-[1,2-di(ethoxycarbonyl)-ethyl] dimethyl phosphorothiolothionate;
S-[α-(ethoxycarbonyl)benzyl] dimethyl phosphorothiolothionate;
dimethyl S-(N-methylcarbamoylmethyl) phosphorothiolothionate;
S-(N-formyl-N-methylcarbamoylmethyl) dimethyl phosphorothiolothionate;
S(N-ethoxy-carbonyl-N-methylcarbamoylmethyl) diethyl phosphoro-thiolothionate;
S-(ethylsulfinylmethyl) diisopropyl phosphorothiolothionate;
S-(2-acetyl-aminoethyl) dimethyl phosphorothiolothionate;
S-(ethylthioethyl) dimethyl phosphorothiolothionate;
diethyl S-(2-ethylthioethyl) phosphorothiolothionate;
S-[(6-chloro-2-oxo-3-benzoxazolinyl) methyl diethyl phosphorothiolothionate;
diethyl S-(phthalimidomethyl) phosphorothiolothionate;
S-[5-methoxy-2-oxo-2,3-dihydro-1,3,4-thiadiazolyl-(3)-methyl] dimethyl phosphorothiolothionate;
S-[4,6-diamino-1,3,5-triazinyl-(2)-methyl] dimethyl phosphorothiolothionate;
S-(2-ethylthioethyl) dimethyl phosphorothiolate;
S-(2-ethyl-sulfinyl-1-methylethyl) dimethyl phosphorotiolate;
dimethyl S-[2-(1-methylcarbamoylethylthio)ethyl] phosphorothiolate;

dimethyl 2,2,2-trichloro-1-hydroxyethylphosphorate;
2,2-dichlorovinyl dimethyl phosphate;
1,2-dibromo-2,2-dichloroethyl dimethyl phosphate;
2-chloro-1-(4-dichlorophenyl) vinyl diethyl phosphate;
tetraethyl pyrophosphate;
tetraethyl S,S-methylene bis(phosphorothiolothionate);
2-methoxy-4H-1,3,2-benzodioxaphosphorin-2-sulfide;
2-chloro-4-methylthiophenyl methyl N-ethyl-phosphoroamidothionate;
S-(2,5-dichlorophenylthiomethyl) diethyl phosphorothiolothionate;
S,S-1,4-dioxone-2,3-diyl bis(diethyl phosphorothiolothionate);
S-benzyl diisopropyl phosphorothiolate;
S-benzyl ethyl phenyl-phosphorothiolate and
o-ethyl diphenyl phosphorodithiolate.

8. The insecticidal and miticidal composition according to claim 7, wherein said organo-phosphorus compound is present in an amount corresponding to ½–¼ by weight of said macrotetrolide compound.

9. A method for eradicating mites and insects which comprises applying the composition according to claim 7 to plants in an amount sufficient to skill mites and insects.

10. A method for eradicating mites and insects which comprises
applying to plants in an amount sufficient to kill mites and insects at least one macrotetrolide compound of the formula:

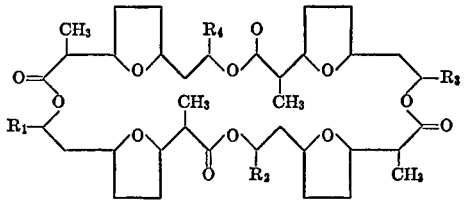

wherein $R_1$, $R_2$, $R_3$ and $R_4$ are each selected from the group consisting of methyl and ethyl.

11. A method in accordance with claim 10 wherein said macrotetrolide compound is applied in an amount of from 50 to 200 g. per 10 ares.

References Cited

Chemical Abstracts, vol. 64 (1966), p. 20035(c).
Domingvez et al., Helvetica Chimica Acta, vol. 45 (1962), pp. 129–134.
Corbaz et al., Helvetica Chimica Acta, vol. 38 (1955), pp. 1445–1448.

SAM ROSEN, Primary Examiner

V. D. TURNER, Assistant Examiner

U.S. Cl. X.R.

424—210, 211, 212, 214, 215, 218, 219, 224, 226, 279

UNITED STATES PATENT OFFICE
CERTIFICATE OF CORRECTION

Patent No. 3,777,023     Dated December 4, 1973

Inventor(s) TAKAO SAGAWA et al.

It is certified that error appears in the above-identified patent and that said Letters Patent are hereby corrected as shown below:

Column 16, line 7, delete and insert new line 5 as follows:

--Polyvinyl alcohol --------------------2--

Column 16, line 6, "Dode--cylbenzenesulfonic" should read -- Dodecylbenzenesulfonic --

Signed and sealed this 25th day of June 1974.

(SEAL)
Attest:

EDWARD M. FLETCHER, JR.
Attesting Officer

C. MARSHALL DANN
Commissioner of Patents